United States Patent [19]
Jennings et al.

[11] Patent Number: 5,492,017
[45] Date of Patent: Feb. 20, 1996

[54] INDUCTIVE PRESSURE TRANSDUCER

[75] Inventors: Charles E. Jennings, Houston, Tex.; Hubert Brandle, Otelfingen, Switzerland; Norman Brammer, Aberdeen, Scotland

[73] Assignee: ABB Vetco Gray Inc., Houston, Tex.

[21] Appl. No.: 196,677

[22] Filed: Feb. 14, 1994

[51] Int. Cl.$^6$ ................... G01L 9/10; G01L 9/14
[52] U.S. Cl. ........................... 73/728; 73/722
[58] Field of Search ................ 73/722, 728, 753, 73/52; 340/850, 854.6, 854.8, 855; 166/66, 69.1, 250, 341; 439/194

[56] References Cited

U.S. PATENT DOCUMENTS

| | | | |
|---|---|---|---|
| 1,956,301 | 9/1927 | Richardson . | |
| 2,328,001 | 8/1943 | Furse et al. . | |
| 3,621,911 | 11/1971 | Baker et al. . | |
| 4,147,222 | 4/1979 | Patten et al. . | |
| 4,167,215 | 9/1979 | Thorne . | |
| 4,291,761 | 9/1981 | Watson . | |
| 4,606,229 | 8/1986 | Spence | 73/722 |
| 4,788,867 | 12/1988 | Kishel | 73/722 |
| 4,826,577 | 5/1989 | Lange . | |
| 4,905,520 | 3/1990 | Nerlich et al. | 73/753 |
| 4,936,148 | 6/1990 | Shaw et al. | 73/728 |
| 5,008,664 | 4/1991 | More et al. . | |
| 5,024,294 | 6/1991 | Van Fossen et al. | 184/108 |
| 5,052,941 | 10/1991 | Hernandez-Marti et al. . | |
| 5,172,112 | 12/1992 | Jennings . | |
| 5,189,415 | 2/1993 | Shimada et al. . | |

OTHER PUBLICATIONS

Considine, Douglas M., Van Nostrand's Scientific Encyclopedia, Fifth Edition, pp. 2100–2101.

(Text) Chapter 6 Electrical Methods, pp. 245–269.

Materials Evaluation/42, Sep. 1984.

(Text) Chapter 6 Electrical methods, pp. 245–269.

Clark, W. G., Jr., Technical Paper, Apr. 1984, Stress Mapping with Eddy Currents.

Condon, E. U., Ph.d., McGraw–Hill, Handbook of Physics, Magnetic Materials, 1967 Second Edition, pp. 4–141–4–144.

Schneider, Eckhardt, Fraunhofer–Institute, Nondestructive Determination of Residual and Applied Stress by Micro–Magnetic and Ultrasonic Methods, pp. 115–122.

Polanschutz, W., NDT International, vol. 19., No. 4, Aug. 1986, Inverse Magnetostrictive Effect and Electromagnetic Non–Destructive Testing Methods, pp. 249–258.

Hallett, J. B., Technical Paper, Apr. 1984, An Eddy Current Probe for Separating Defects from Resistivity Variations in Zirconium Alloy Tubes.

*Primary Examiner*—Kenneth A. Wieder
*Assistant Examiner*—William L. Oen
*Attorney, Agent, or Firm*—James E. Bradley

[57] ABSTRACT

An inductive pressure transducer senses fluid pressure within a tubular member by passing an alternating current within an inductor coil to generate a magnetic field. The magnetic field passes through a gap between the tubular member and the inductor coil, and into an exterior portion of the tubular member. A detector means senses the net energy transferred from the inductive coil by the magnetic field, which indicates the fluid pressure within the tubular member.

23 Claims, 4 Drawing Sheets

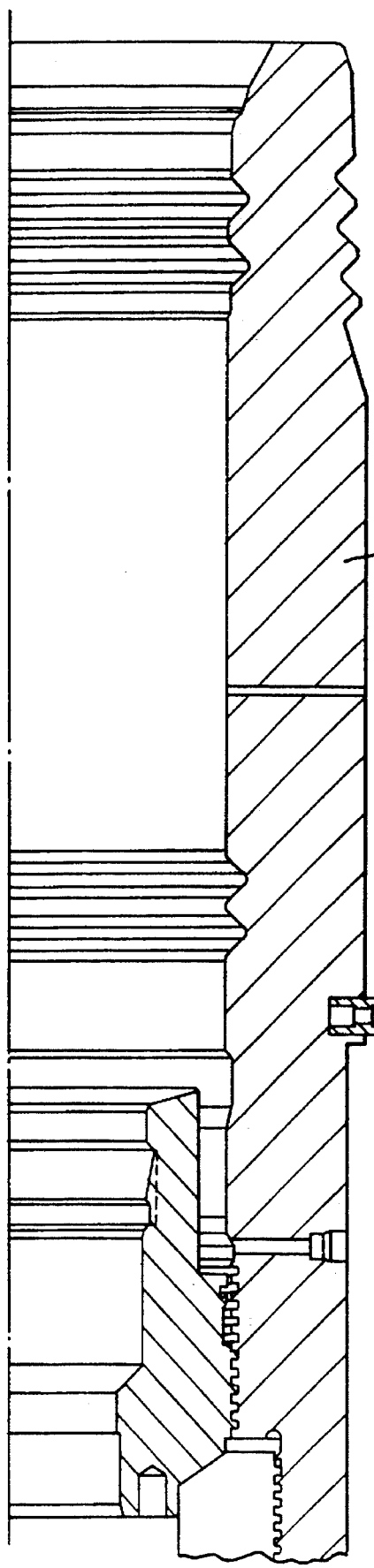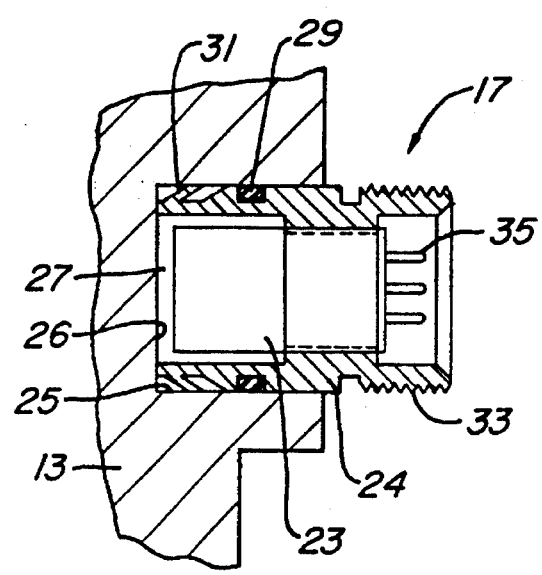

INDUCTIVE PRESSURE TRANSDUCER

BACKGROUND OF THE INVENTION

1. Field of the Invention

This invention relates in general to pressure transducers for sensing pressure within tubular members, and in particular to a method and apparatus for inductively sensing pressure within a subsea wellhead housing.

2. Description of the Prior Art

Prior Art pressure transducers have been used for monitoring fluid pressures within tubular members, such as subsea wellhead housings. Typically, pressure within tubular members have been monitored by coupling a prior art pressure transducer to a port passing into the interior of the tubular member. Another prior art means has been to secure resistive strain gauges to the exterior of tubular members for monitoring pressure therein.

For oil field applications, a need exists to periodically monitor the pressure in certain tubular members in well installations, both on land and at sea. For example, in one type of well, an outer wellhead housing will enclose an inner wellhead housing. The inner wellhead housing directly supports casing, tubing and the like which are subject to high pressure. The annulus surrounding the casing is normally not under any pressure. The annulus surrounding the casing communicates with a lower portion of the interior of the inner wellhead housing. In the event of leakage in this casing, the inner wellhead housing would be subject to pressure.

Checking the pressure in the inner wellhead housing would indicate whether or not any casing leakage has occurred. In the prior art, this is not done because installing a pressure sensor would require drilling a hole through the sidewall of the inner wellhead housing for receipt of one of the above-mentioned typical pressure transducers. However, because of the possibility of leakage, operators prefer to avoid drilling holes through the sidewall of wellhead housings. Further, because of the harsh and corrosive environments often encountered in petroleum well installations, prior art resistive strain gauges may not adequately perform over the service life of a wellhead housing.

SUMMARY OF THE INVENTION

In the present invention, fluid pressure within a tubular member is monitored by an inductive coupling means. The inductive coupling means receives electrical power and generates a magnetic field which passes magnetic energy to the tubular member. A detector means senses a net energy transferred from the inductive coupling and generates an output signal which indicates the net energy transferred. A transmission means transmits a data signal to a processing unit in response to the output signal, where the data signal is processed to determine the fluid pressure within the tubular member.

In the preferred embodiment of the present invention, pressure is monitored within a subsea wellhead housing. An inductive coupling means is provided by an oscillator which passes an alternating current into an inductor coil to generate the magnetic field. The magnetic field magnetically couples the inductor coil to the wellhead housing for passing energy therebetween. The detector circuit then senses the amplitude of the alternating current which the oscillator passes through the inductor coil and generates an output signal in response to the measured amplitude. The amplitude of the alternating current passing within the inductor coil varies in response to the combined impedance of the inductor coil and magnetically coupled loads, such as the load from magnetic energy transferred to the wellhead housing from inducing eddy currents in the wellhead housing. The energy load absorbed by the wellhead housing is dependent upon electromagnetic properties of the material from which the wellhead housing is formed, which vary with the stress induced in the wellhead housing in response to fluid pressure therein.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a fragmentary quarter sectional view of a wellhead housing, which shows a pressure sensing assembly of the present invention secured to the wellhead housing;

FIG. 2 is a sectional view depicting the inductive coupling assembly of the present invention;

DETAILED DESCRIPTION OF THE PREFERRED EMBODIMENT

Figure 3:
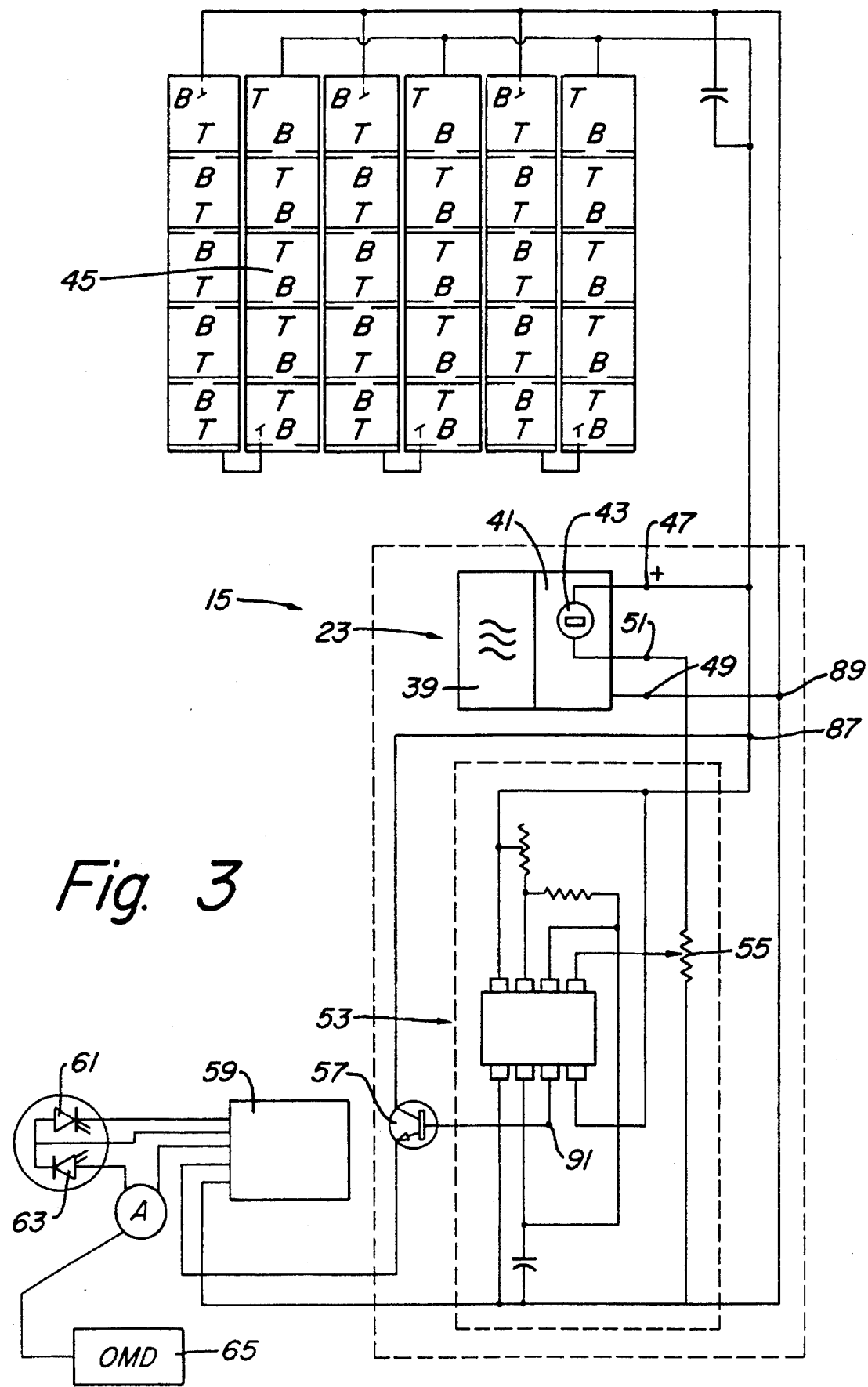
FIG. 3 is a schematic diagram depicting more details of the pressure sensing assembly of the present invention.

Referring to FIG. 1, a fragmentary, quarter sectional view depicts a portion of subsea wellhead 11 to which is secured pressure sensing assembly 15 of the preferred embodiment of the present invention. Wellhead 11 includes wellhead housing 13, which is a tubular member. Pressure sensing assembly 15 is provided for inductively sensing an internal fluid pressure within wellhead housing 13. Pressure sensing assembly 15 includes inductive coupling assembly 17, transmission means 19, and power supply 21. Inductive coupling assembly 17 is mounted within wellhead housing 13. Transmission means 19 couples inductive coupling assembly 17 to power supply 21. Power supply 21 both provides power to inductive coupling assembly 17, and provides a processing means which transmits a data signal in response to an output signal from inductive coupling assembly 17.

In some embodiments of the present invention, transmission means 19 is a cable conducting an output signal to a monitoring station at which a processing means may be located, such as, for example, on a production platform for an offshore well. In the preferred embodiment of the present invention, transmission means 19 is a cable connecting inductive coupling 17 to power supply 21. Power supply 21 is an underwater unit for supplying power to inductive coupling assembly 17 in response to a light source from a remote operated vehicle (ROV), and for providing a readout means for passing a data signal to the ROV for transmission to the surface. The data signal is generated in response to the output signal from inductive coupling assembly 17, and indicates the interior fluid pressure within wellhead housing 13 of subsea wellhead 11.

Referring to FIG. 2, a sectional view depicts inductive coupling assembly 17. Inductive sensor 23 is located within housing 24 to protect inductive sensor 23 from exposure to fluids. Housing 24 is sealingly located within hole 25, formed in the sidewall of wellhead housing 13. Hole 25 is a blind hole having a base 26. An air gap 27 of about seventy thousandths (0.070) of an inch is provided between inductive sensor 23 and base 26 of wellhead housing 13. In the preferred embodiment of the present invention, the distance across air gap 27 does not change with a change in fluid pressure within wellhead housing 13, even if the dimensions of wellhead housing 13 change in response to changes in fluid pressure. The constant air gap is due to the fixed mounting of inductive sensor 23 to wellhead housing 13 for movement therewith by means of housing 24.

Housing 24 includes O-ring seal 29, which is a conventional seal, and chevron-type metal-to-metal seal portion 31. Seals 29, 31 seal within hole 25. Threaded end 33 is provided around electrical pins 35 for connecting to a transmission means, such as transmission means 19 (shown in FIG. 1). An electrical receptacle (not shown) secures to threaded end 33 of housing 24 for connecting transmission means 19 (shown in FIG. 1) to inductive sensor 23.

Referring to FIG. 3, a schematic diagram depicts pressure sensing assembly 15, which in the preferred embodiment of the present invention is utilized for sensing pressure in housing 13 of subsea wellhead 11. Pressure sensing assembly 15 is intended for use with a remote operated vehicle (ROV) and may be incorporated into such a system as shown in U.S. Pat. No. 5,172,112, issued on Dec. 15, 1992, entitled "Subsea Well Pressure Monitor", invented by Charles E. Jennings, and assigned to ABB Vetco Gray, Inc., the disclosure of which is hereby incorporated by reference as with fully set forth herein.

Inductive sensor 23 includes inductor coil 39, having a coil and ferrite core, oscillator 41, and detector circuit 43. Photo-cell array 45 is provided for receiving light from an ROV (not shown) to provide electrical power to pressure sensing assembly 15. DC voltage is provided across terminal 47, which is positive in the preferred embodiment, and terminal 49. Inductive sensor 23 further includes output terminal 51, through which a DC output signal is provided which indicates the pressure in wellhead housing 13 (shown in FIG. 1).

The rated electrical power required for operating inductive sensor 23 is 18 to 30 volts dc with a 150 milliamp maximum current. However, tests have determined that the minimum voltage required for operating inductive sensor 23 is 13 volts at 20 milliamps. The output from detector circuit 43 to terminal 51 ranges from 4 to 20 milliamps, depending upon the detected amplitude of the current oscillating in inductor coil 39, as described below.

Voltage controlled oscillator 53 receives DC power from photo cell array 45. The output signal from output terminal 51 passes through resistor 55, which applies a control voltage to voltage controlled oscillator 53. Voltage controlled oscillator 53 is connected to amplifier 57 which powers laser driver 59. Laser driver 59 powers laser diode 61. Photo diode 63 is provided for connecting to an optional metering device 65.

Operation of pressure sensing assembly 15 is now described. An ROV (not shown) provides light to photo cell array 45, which produces a DC voltage capable of generating more than 15 volts from a reasonably bright light from the ROV (not shown). This voltage is provided across terminals 47 and 49 to power oscillator 41 and detector circuit 43.

Oscillator 41 provides an oscillating electric current having a frequency in the kHz range. The oscillating current passes within inductor coil 39 at high frequencies and generates a magnetic field which passes into wellhead housing 13 (shown in FIG. 1). The magnetic field passing through wellhead housing 13 induces eddy currents within wellhead housing 13 and is affected by electromagnetic properties of the material from which wellhead housing 13 is made. Such electromagnetic properties of the material from which wellhead housing 13 is formed include magnetic permeability and resistivity, which vary with stress induced in the wellhead housing 13 by fluid pressure. Wellhead housing 13 and inductor coil 39 combine, along with other materials which may be disposed about inductor 39, to provide an electromagnetic circuit having a net overall impedance to which oscillator 41 is supplying the high frequency voltage.

Energy transmitted to wellhead housing 13 reduces the energy oscillating within inductor coil 39 and results in a lower amplitude of current passing within inductor coil 39. Detector circuit 43 detects the amplitude of the high frequency current induced by oscillator 41. From the detected amplitude of the current, detector circuit 43 outputs an output signal to output terminal 51. The output signal has a d.c. current which ranges between 4 and 20 milliamps, and which is proportional to the amplitude of the high frequency current oscillating within inductor coil 39. The greater the energy transferred to wellhead housing 13 (shown in FIG. 1), the greater the loss of energy from the oscillator circuit, and the smaller the amplitude of oscillation of the high frequency current which is sensed by detector circuit 43.

The output signal then passes from output terminal 51 and through resistor 55. The d.c. current, which corresponds to the value of the amplitude of the high frequency current oscillating in inductor coil 39, passes through resistor 55 and generates a control voltage which is applied to voltage controlled oscillator 53.

Voltage controlled oscillator 53 then generates a data signal having a frequency which corresponds to the output voltage determined by passing the output signal from output terminal 51 through resistor 55. The data signal from voltage controlled oscillator passes to amplifier 57, which amplifies the signal and passes the signal to laser driver 59.

Laser driver 59 requires from 4 to 13 volts d.c. for power. Laser driver 59 then drives laser diode 61, which flashes at the frequency generated by voltage controlled oscillator 53, which corresponds to the voltage determined by the output signal from output terminal 51. The frequency of laser diode 61 provides a data signal which may be transferred to a monitoring equipment on a production platform by the ROV (not shown). Further, optional equipment such as optional metering device 65 may be operated by use of photo diode 63.

Figure 4:
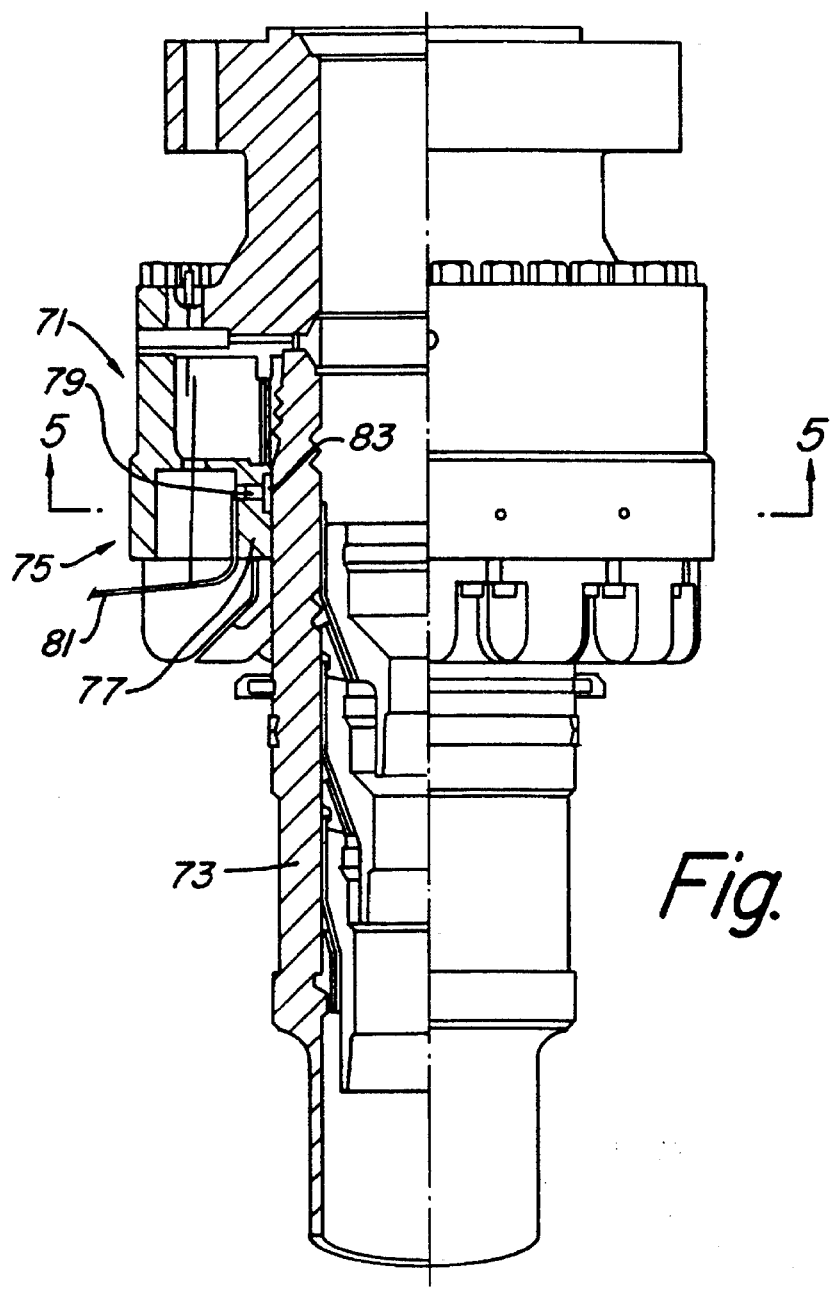
FIG. 4 is a one quarter longitudinal section view of a wellhead assembly which depicts an alternative embodiment of the present invention.

Referring now to FIG. 4, a one-quarter longitudinal section view depicts an alternative embodiment of the present invention for use in wellhead assembly 71. Wellhead assembly 71 includes wellhead housing 73 and wellhead connector 75 which provides a pressure sensing assembly of the alternative embodiment of the present invention. Wellhead connector 75 includes toroidal member 77 within which inductive sensors 79 are secured. Inductive sensors 79 are connected to a transmission means 81 for transmitting data signals to a remote processing unit, which may be similar to power supply 21 (shown in FIG. 1). Annular space 83 is provided to define a gap between inductive sensor 79 and the exterior sidewall of wellhead housing 73. In this alternative embodiment of the present invention, annular space 83 is filled with seawater.

Figure 5:
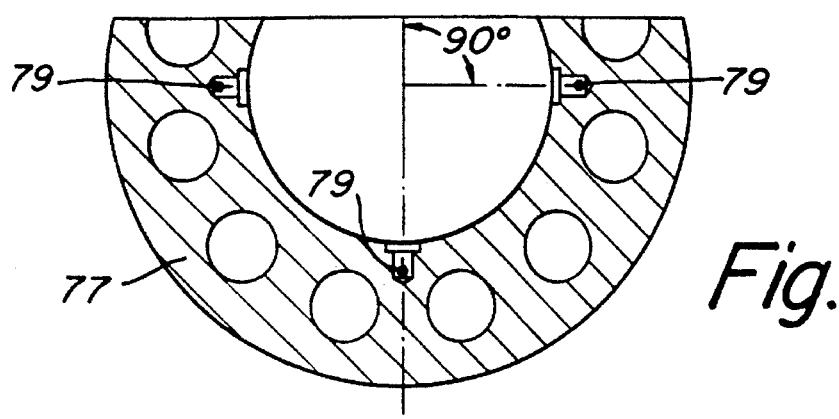
FIG. 5 is a partial sectional view taken along Section Lines A—A of FIG. 4.

Referring to FIG. 5, a partial sectional view taken along Section A—A of FIG. 4 depicts toroidal member 77 to show the positioning of inductive sensors 79 about toroidal member 77. In this alternative embodiment, there are four inductive sensors 79 spaced about toroidal member 77 at 90 degree angles from one another.

Operation of the alternative pressure sensing assembly provided by wellhead connector 75 to detect pressure within wellhead housing 73 is now described with reference to FIGS. 4 and 5. Inductive sensors 79 generate a magnetic field in a manner similar to that described for inductive sensors 23. The total impedance load which is provided by inductive sensors 79 is affected by both the size of annular space 83 and the electromagnetic energy losses to wellhead housing 73. Fluid pressure variations within wellhead housing 73 affect both annular space 83, such as an increase in pressure will reduce annular space 83, and further affect the electromagnetic properties of the material from which wellhead housing 73 is formed. Thus, the total impedance load of an equivalent electrical circuit which includes inductive sensors 79 will vary with the pressure within wellhead housing 73. The output signals from inductive sensors 79 are then transmitted by transmission means 81 to a remote processing unit, such as by transmitting the output signals to a production platform by means of either a data cable or by means of an ROV (not shown).

Figure 6:
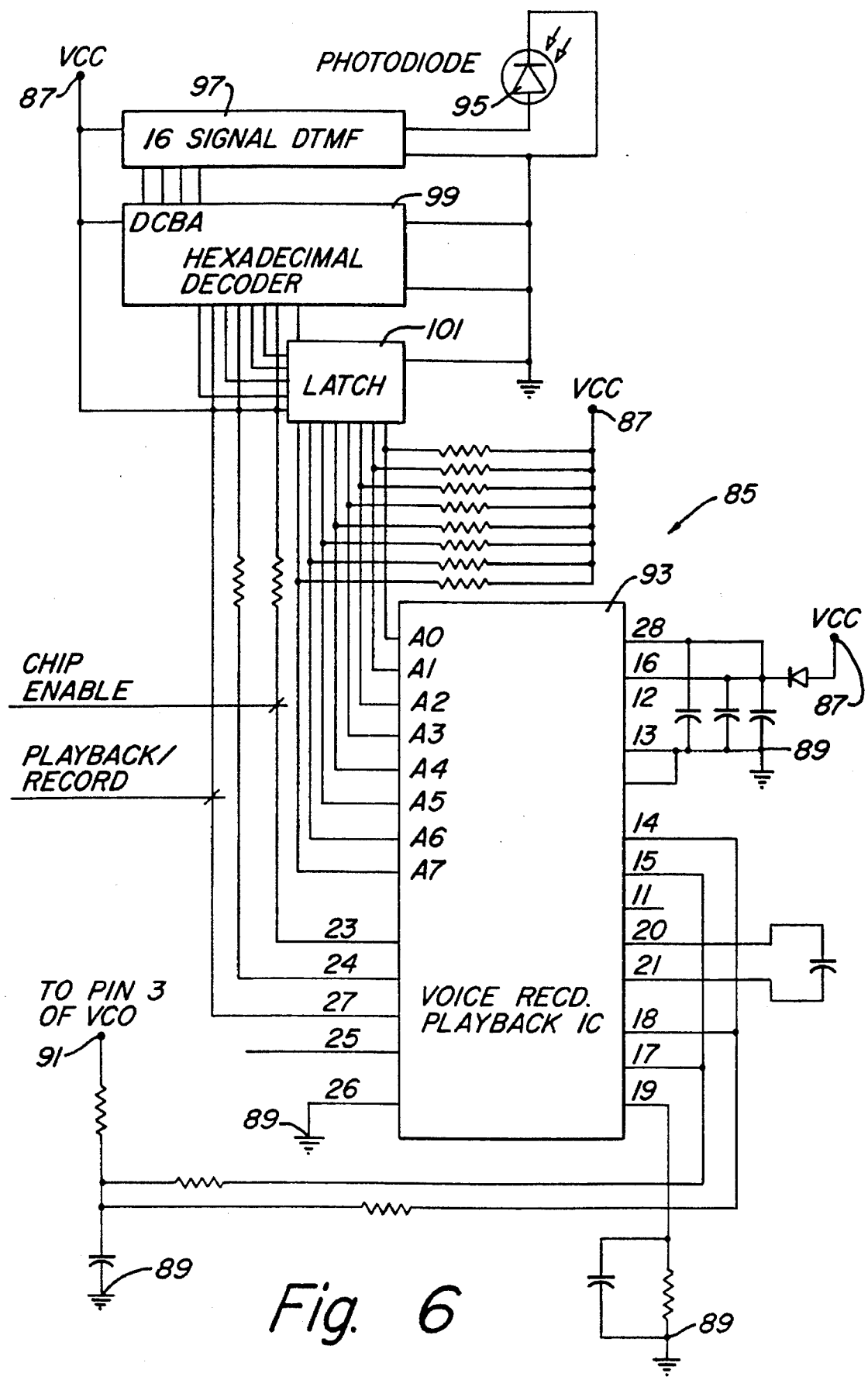
FIG. 6 is a schematic diagram depicting a record/playback circuit of a second alternative embodiment of the present invention.

Referring to FIG. 6, a schematic diagram depicts record/playback circuit 85 of a second alternative embodiment of the present invention. Record/playback circuit 85 may be electrically connected to pressure sensing assembly 15 of the preferred embodiment of the present invention at, referring to FIGS. 3 and 6, node 87 to provide circuit 85 with d.c. power, node 89 to connect circuit 85 to ground, and node 91 to input a data signal for recording and to output a recorded data signal during playback mode. In record mode, a data signal will be received from voltage controlled oscillator 53 for storage. In playback mode, a previously recorded data signal will pass from record/playback circuit 85, through node 91, and to amplifier 57 for passing to laser driver 59, which controls power to laser diode 61.

Referring to FIG. 6, record playback circuit 85 includes record/playback module 93, which in this alternative embodiment of the present invention is an Archer ISD1000A Voice Record/Playback IC available from Radio Shack, a Division of Tandy Corporation, of Fort Worth, Tex. Control of module 93 is accomplished by means of record/playback circuit 85 as shown. Module 93, as used herein, can store up to eight (8) separate data samples of different frequencies output from voltage controlled oscillator 53 (shown in FIG. 3). If a ninth data signal is stored in module 93, the oldest, and first recorded, data signal is discarded.

Control circuit 85 includes photodiode 95, tone decoder 97, hexidecimal decoder 99, and latch 101. Photodiode 95 is for placing in proximity to photocell array 45 for receiving a light signal from the ROV. The light signal carries a dual tone signal (modulated frequency) which is transmitted to photodiode 95. Photodiode 95 emits an electrical signal in response to the light signal from the ROV. The electrical signal is transmitted to tone decoder 97 to transmit the dual tone signal to tone decoder 97.

Tone decoder 97 is provided for receiving the dual tone signal from photodiode 95, and emitting a 4-bit hexidecimal code in response thereto. Different dual tone signals may be sent to tone decoder 97 to encode up to sixteen (16) different commands to tone decoder 97, which emits the 4-bit hexidecimal code which can represent up to 16 different values. Tone decoder 97 may be provided by a G.E./R.C.A. DTMF tone decoder IC, having part number CD22204E, and available from Circuit Specialists, of Scottsdale, Ariz., in combination with a bias register and 3.57 MHz clock crystal.

Hexidecimal decoder 99 is provided for receiving the 4-bit hexidecimal coded signal from tone decoder 97, and emits discrete outputs in response thereto. Latch 101 is provided to hold the discrete outputs. The discrete outputs provide for a control signal for controlling record/playback module 93.

Operation of record/playback circuit 85 is accomplished by transmitting a light signal carrying the dual-tone code to photodiode 95. Photodiode 95 emits an electrical signal in response to the light signal, and transmits the electrical signal to tone decoder 97. Tone decoder 97 emits a 4-bit hexadecimal code, which hexadecimal decoder 99 converts to a plurality of discrete outputs. Latch 101 holds the discrete outputs to provide a control signal for controlling operation of record/playback module 93. This controls whether module 93 is in playback mode, record mode, or standby mode.

Data samples stored within module 93 can then pass through to an ROV (not shown), or to a production platform, for comparison with current readings from pressure sensing assembly 15 to determine if the pressure within wellhead housing 13 has changed between the different data samples. Further, the data samples can be processed to determine the pressure within wellhead housing 13.

The present invention offers several advantages over prior art pressure transducers. The inductive pressure transducer of the present invention does not require drilling a hole through a side wall of the wellhead housing to determine the interior fluid pressure of the wellhead housing. Thus, pressure may be monitored within the inner walls of a well housing without requiring holes to be drilled which would threaten the hydraulic integrity of the wellhead. Further, an alternative is provided to resistive strain gages.

Although the invention has been described with reference to two specific embodiments, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

I claim:

1. An apparatus for monitoring fluid pressure within a tubular member, the apparatus comprising:

a power supply;

an inductive coupling means mounted adjacent to an exterior portion of the tubular member for receiving electrical power from the power supply and emitting a magnetic field in response thereto, the magnetic field magnetically coupling the inductive coupling means to the tubular member for transferring energy therebetween; and detector means for sensing a net energy transferred between the inductive coupling means and the tubular member, and generating an output signal which indicates the net energy transferred between the inductive coupling means and the tubular member, the net energy transferred being indicative of pressure in the tubular member.

2. The apparatus of claim 1, wherein the tubular member is a subsea wellhead housing.

3. The apparatus of claim 1, wherein the inductive coupling means comprises an inductor coil.

4. The apparatus of claim 1, wherein the inductive coupling means comprises an inductor coil mounted adjacent to the exterior portion of the tubular member.

5. The apparatus of claim 1, wherein:

the inductive coupling means includes an inductor coil;

the tubular member has a blind hole formed into the exterior portion of the tubular member; and the inductor coil is mounted within the blind hole and spaced from the tubular member by a gap.

6. The apparatus of claim 1, wherein the inductive coupling means includes an inductor coil, and wherein the apparatus further comprises:

a rigid member which extends exteriorly about and is radially spaced from the tubular member; and wherein the inductor coil is mounted to the rigid member, defining a gap between the inductor coil and the tubular member.

7. An apparatus for sensing pressure within a tubular member, the apparatus comprising:

a power supply;

an oscillator for receiving electrical power from the power supply and generating an alternating current in response thereto;

an inductor coil for receiving the alternating current and inducing a magnetic field in response thereto;

the inductor coil being positioned adjacent to an exterior portion of the tubular member for passing the magnetic field into the exterior portion to magnetically couple the inductor coil to the tubular member; and a detector circuit for sensing a change in the alternating current passing within the inductor coil in response to a pressure change within the tubular member, and for generating an output signal in response thereto.

8. The apparatus of claim 7, wherein the tubular member is a subsea wellhead housing.

9. The apparatus of claim 8, wherein:

the tubular member has a blind hole formed into the exterior portion of the tubular member; and the inductor coil is mounted within the blind hole and spaced from the tubular member by a gap.

10. The apparatus of claim 7 further comprising:

a rigid member which extends exteriorly about the tubular member; and wherein the inductor coil is mounted to the rigid member, defining a gap between the inductor coil and the tubular member.

11. The apparatus of claim 10, wherein the rigid member is a toroidal member which extends exteriorly around a circumference of the tubular member.

12. The apparatus of claim 7, wherein the change in the alternating current passing within the inductor coil is a change in amplitude.

13. An apparatus for sensing pressure within a subsea wellhead housing, the apparatus comprising:

a power supply;

an oscillator for receiving electrical power from the power supply and generating an alternating current in response thereto;

an inductor coil for receiving the alternating current and inducing a magnetic field in response thereto;

an exterior portion of the subsea wellhead housing having a blind hole formed therein, the blind hole having a base which defines a surface of the subsea wellhead housing;

the inductor coil being sealingly mounted within the blind hole, separated from the base by an air gap, for passing the magnetic field into the exterior portion to magnetically couple the inductor coil to the subsea wellhead housing;

a detector circuit for sensing an amplitude of the alternating current passing within the inductor coil, which varies in proportion to pressure within the subsea wellhead housing, and for generating an output signal in response to the amplitude of the alternating current; and means for processing the output signal to provide a readout of the fluid pressure within the subsea wellhead housing.

14. The apparatus for sensing pressure of claim 13, further comprising:

a data storage and playback means for recording the output signal for playback at a later time.

15. An apparatus for monitoring fluid pressure within a subsea wellhead housing, the apparatus comprising:

a power supply;

a rigid member disposed exteriorly about the subsea wellhead housing and radially spaced therefrom such that any radial movement of the subsea wellhead housing due to the fluid pressure therein will not cause any radial movement of the rigid member;

a plurality of inductive sensors disposed interiorly about said rigid member, separated from an exterior surface of the subsea wellhead housing by a gap;

the inductive sensors for receiving electrical power from the power supply and emitting magnetic fields in response thereto, the magnetic fields passing in the gap between the rigid member and the subsea wellhead housing;

detector circuit for sensing an amount of energy transferred by the magnetic field, and generating an output signal which indicates the amount of energy transferred by the magnetic field, the amount of energy transferred by the magnetic field varying in response to changes in dimension of the gap and in response to changes in the fluid pressure within the subsea wellhead housing; and means for processing the output signal to determine the fluid pressure within the subsea wellhead housing.

16. The apparatus of claim 15, wherein each of the inductive sensors comprises:

an oscillator for receiving the electrical power from the power supply and generating an alternating current in response thereto;

an inductor coil for receiving the alternating current and emitting the magnetic field in response thereto for magnetically coupling the inductor coil to the subsea wellhead housing; and wherein the detector circuit senses the energy transferred by the magnetic field by sensing an amplitude of the alternating current passing within the inductor coil.

17. The apparatus of claim 16, wherein the rigid member is a toroidal member which is concentrically disposed exteriorly about a circumference of the subsea wellhead housing.

18. The apparatus claim 16, further comprising:

a data storage and playback means for recording the output signal for playback at a later time.

19. A method for monitoring fluid pressure within a tubular member, the method comprising the steps of:

positioning an inductive coupling means in proximity to an exterior portion of the tubular member;

providing electrical power to the inductive coupling means;

emitting a magnetic field from the inductive coupling means to magnetically couple the inductive coupling means to the tubular member for transferring energy therebetween;

sensing a net energy transferred between the inductive coupling means and the tubular member;

generating an output signal which indicates the net energy transferred between the inductive coupling means and the tubular member, which is indicative of the fluid pressure within the tubular member; and processing the output signal to determine the fluid pressure within the tubular member.

20. The method of claim 19, wherein the inductive coupling means comprises an inductor coil;

wherein the step of providing electrical power to the inductive coupling means comprises providing alternating current to the inductor coil; and wherein the net energy transferred between the inductive coupling means and the tubular member is determined by sensing an amplitude of the alternating current passing within the inductor coil.

21. The method of claim 19, wherein the step of positioning an inductive coupling means in proximity to the tubular member comprises:

providing a blind hole within the tubular member which extends to a base; and securing the inductive coupling means within the blind hole, separated from the base by a gap.

22. The method of claim 19, wherein the step of positioning an inductive coupling means in proximity to the tubular member comprises:

disposing a toroidal member concentrically about and radially spaced from an exterior of the tubular member; and securing the inductive coupling means to the toroidal member, in proximity to the tubular member with a gap therebetween for passing the magnetic field between the tubular member and the toroidal member.

23. The method of claim 19, further comprising the steps of:

storing the output signal for playback at a later time; and playing back the output signal during acquisition of a later output signal for comparison between the output signal and the later output signal to determine changes in the fluid pressure.

* * * * *